A. DE GREGORY.
BAKING PAN.
APPLICATION FILED SEPT. 8, 1920.
1,407,131. Patented Feb. 21, 1922.
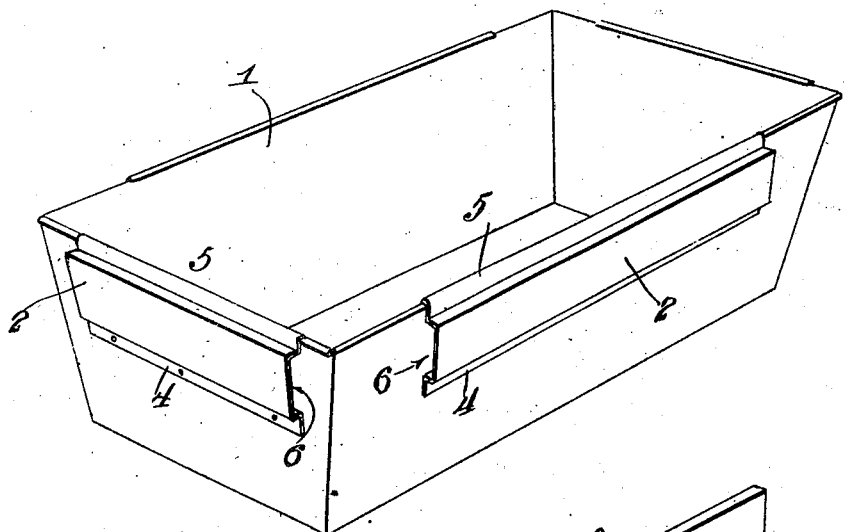
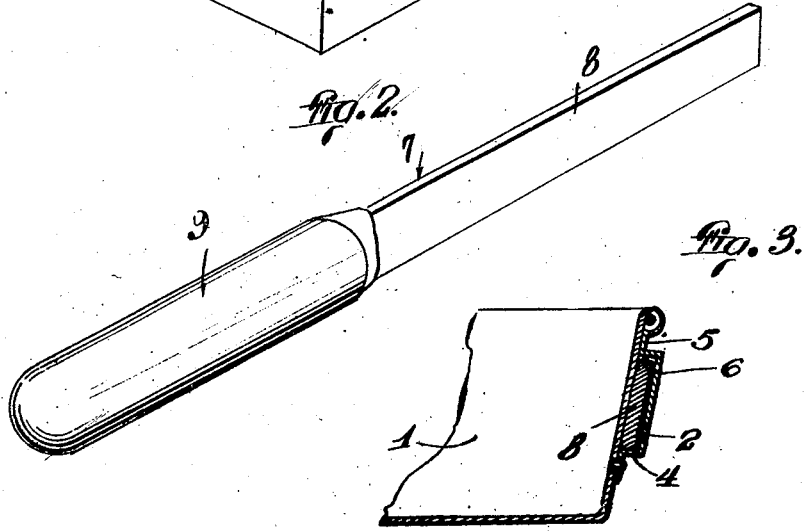
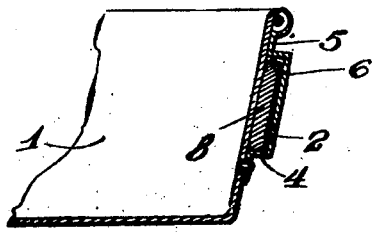
Inventor
Alfred De Gregory

UNITED STATES PATENT OFFICE.

ALFRED DE GREGORY, OF BROOKLYN, NEW YORK.

BAKING PAN.

1,407,131. Specification of Letters Patent. Patented Feb. 21, 1922.

Application filed September 8, 1920. Serial No. 408,824.

*To all whom it may concern:*

Be it known that I, ALFRED DE GREGORY, a citizen of the United States, residing at Brooklyn, in the county of Kings and State of New York, have invented certain new and useful Improvements in a Baking Pan, of which the following is a specification.

This invention relates to cooking utensils and more particularly to an improved attachment for baking pans.

The primary object of the invention is to provide a baking pan with a means for receiving a detachable handle which may be employed to turn or lift the baking pan while it is within the hot oven, so that the user may accomplish the turning or lifting without danger of burning his hand.

Other objects of the invention will appear upon consideration of the following detail description and accompanying drawings, wherein:—

Figure 1 is a perspective view of the pan constructed in accordance with my invention, Figure 2 is a perspective view of the lifting device, and Figure 3 is a detail section through a portion of the pan.

Referring to the drawing by numerals, the pan 1 is of conventional form and may be of any size, or configuration. Each longitudinal side and each end is provided with an attachment 2 which consists of a metal strip shaped to provide a longitudinal channel having longitudinal marginal flanges 4 and 5. The flanges 5 are secured to the upper edge of the pan and the flanges 4 are secured to the side wall by suitable fastening members so that the channel forms an elongated opening 6 of rectangular shape in cross section. These are provided on all sides of the pan as stated.

The lifting member 7 comprises a blade 8 substantially rectangular and shaped to fit into the space 6 in the channel. One end of the blade is equipped with a handle 9.

When the pan is in a hot oven and contains any food ingredients to be cooked it is often necessary to turn the pan or lift the same to remove it from the oven. This may be easily accomplished by grasping the handle 9 of the lifting device and thrusting the blade 8 through any one of the openings 6 whereupon the handle may be utilized to lift or turn the pan. The handle may then be withdrawn so that the implement is entirely removed from the pan to be used for turning another pan.

Minor changes may be made in the details of construction without departing from the spirit of the invention or the scope of the claims hereunto appended.

What I claim is:—

In combination, a cooking utensil of conventional form having channel shaped members secured to its opposite sides and end walls to form longitudinal openings of rectangular shape in cross section on the sides and ends of the utensil, and a lifting member comprising an elongated blade shaped to fit any one of said openings and equipped with a handle at one end.

In testimony whereof, I have affixed my signature in the presence of two witnesses.

ALFRED DE GREGORY.

Witnesses:
ALBERT RUTH,
ROSE LANGE.